March 18, 1930.   A. J. WEATHERHEAD, JR   1,750,697
CONTROLLING DEVICE
Filed May 25, 1929
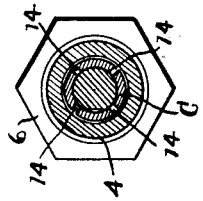
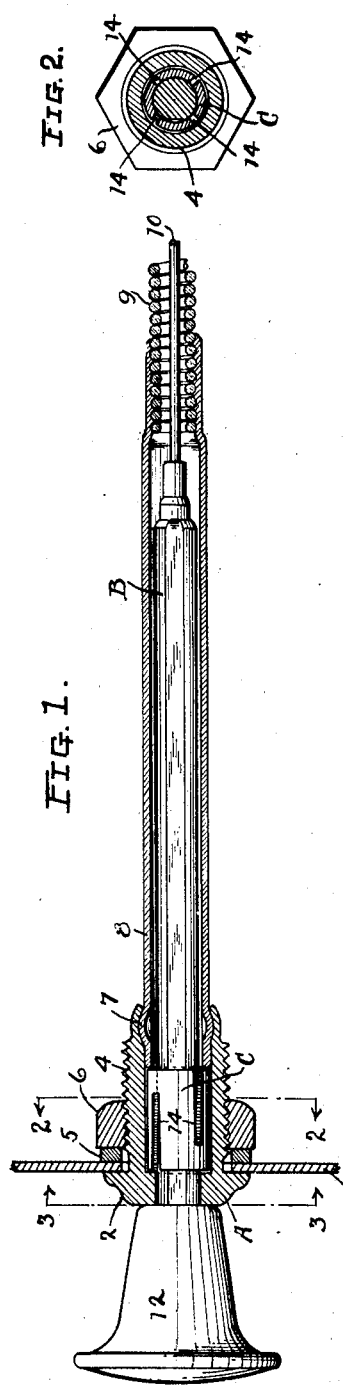
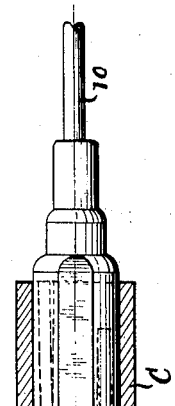
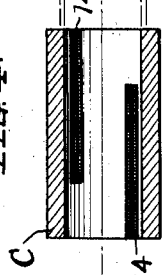
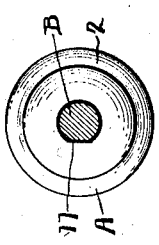
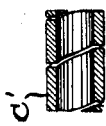
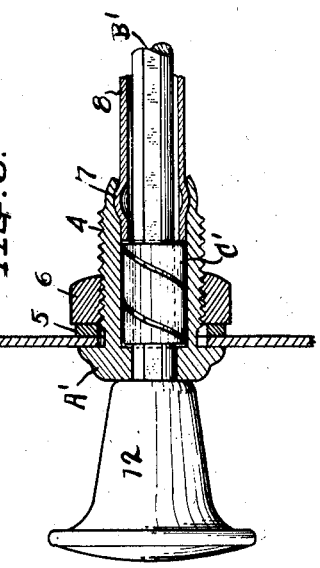
INVENTOR
A. J. Weatherhead Jr.
BY
ATTORNEYS Patented Mar. 18, 1930

1,750,697

UNITED STATES PATENT OFFICE

ALBERT J. WEATHERHEAD, JR., OF CLEVELAND, OHIO

CONTROLLING DEVICE

Application filed May 25, 1929. Serial No. 365,964.

The present invention relates to an improvement in a choke controlling device for automobiles, the object in general being to provide a simple attachment for the instrument board of an automobile whereby a reciprocable controlling element may be frictionally held against longitudinal movement when not manipulated by the operator. More specifically, my object is to provide an effective clutch assembly of inexpensive and durable construction for a manually operable rod or shaft such as commonly employed in automobiles to control the choke valve in a carburetor, reference being had to the accompanying drawings, in which Fig. 1 is a sectional view longitudinally of a controlling device embodying my invention; Fig. 2 a cross sectional view thereof on line 2—2 of Fig. 1; Fig. 3 a cross sectional view on line 3—3 of Fig. 1; Fig. 4 a sectional view longitudinally of the clutch collet; and Fig. 5 a similar view showing the collet expanded upon a rod or shaft. Figs. 6 and 7 are sectional and detail views, respectively, of a modified form of clutch collet.

The invention comprises a tubular fitting or attachment member A having an enlarged head 2 adapted to abut against the outer face of a panel or plate 3 having an opening through which the screw-threaded shank 4 of the fitting extends to permit a lock washer 5 and nut 6 to be secured thereto in clamping engagement with the panel or plate 3. The inner end of shank 4 is counterbored and contracted to smaller dimensions upon the ribbed or enlarged extremity 7 of a tube 8 which provides a fixed extension for the shank. A flexible conduit 9 made of spirally wound wire is firmly affixed to the end tube 8, and the operating wire 10 passes through the conduit to the carburetor valve or other part to be operated and controlled.

The wire is attached in any suitable way to the end of a controlling rod or shaft B movable lengthwise within the fitting but not rotatable therein, to prevent rotation of the rod, the head portion 2 of member A is broached to provide a partly round and partly straight sided opening 11, see Fig. 3, and the round control rod or shaft B is flattened lengthwise to fit said opening, thereby permitting the rod to slide but not to turn in respect to member A.

However, the slidable movement of control rod B is frictionally governed to permit the choke valve or other part under control to be held stationary or in any fixed position that the operator may elect. This result is obtained in a simple mode and manner by sleeving a spring collet C upon rod B and confining it within tubular fitting A, so that it may expand and contract freely but not shift lengthwise in any appreciable degree in respect to the fitting.

It is desirable that rod B be gripped fairly tightly by the collet and still permit the operator to reciprocate the same easily by means of the knob or handle 12, and inasmuch as such controlling devices are manipulated quite often it is also desirable that such frictional gripping results should remain constant and equally effective after frequent or long usage. To gain that end the collet C shown in Figs. 1 to 5, inclusive, comprises a short sleeve or band made of spring metal slitted or slotted lengthwise from each end edge. The slits or slots 14 in the sleeve or collet therefore extend in opposite directions, and preferably overlap or extend beyond the inner ends of each other so that the respective divisions or sections of the sleeve or collet are of substantial length to provide a substantial degree of spring movement in each division or section at each end of the collet.

The clutching action of the collet on the rod is thereby greatly promoted and clutching occurs at both ends of the collet, and the collet can also be expanded throughout its entire length over a rod of substantially larger diameter than the normal internal diameter of the sleeve or collet, although not severed or split entirely lengthwise from end to end. The actual device is comparatively small, the rod being approximately five thirty-seconds of an inch in diameter but the present collet affords exceptionally effective clutching results for a collet that small in size.

Moreover, when the collet is expanded it contracts equally with the same clutching effect at all radial places therein, and with substantially the same gripping results as wear occurs and is taken up by the collet, thereby providing a collet of exceptional durability and long life without the addition of bushings or other wear or friction aiding auxiliaries.

In Figs. 6 and 7, I show a modified form of collet C' comprising a flat band of spring metal wound spirally to a smaller diameter internally than rod B'. The flat convolutions are relatively wide and therefore this form of collet has a relatively large frictional gripping face engaging the rod and may be made to work quite satisfactorily with a rod of such small diameter as described herein. This form of collet also completely encircles the rod and the greatest tension therein is localized intermediate the ends thereof where the spiral band is widest and the resistance to expansion thereof greatest, although the opposite ends of the bands operate also with good clutching effect on the rod.

That is, the opposite ends of this collet clutch the rod independently in somewhat the same way as the slotted collet shown in Fig. 1. Both collets also encircle the rod circuitously or sinuously. Thus, the double-ended slots in the collet shown in Fig. 1 subdivide the stock so that the clamping portions thereof extend circuitously around the collet, and the collet shown in Fig. 7 is divided spirally to provide circuitous or sinuous clamping portions.

What I claim, is:

1. A controlling device, substantially as herein described, comprising a tubular fitting having a reciprocable control rod extending therethrough, and a flat spring collet housed within said fitting and completely encircling and gripping said rod equally at different radial places therein.

2. A controlling device, substantially as herein described, comprising a tubular fitting, a reciprocable rod extending through said fitting, and a spring collet housed in an expanded condition upon said rod, within said fitting, said collet being sub-divided to provide independent gripping portions at opposite ends thereof.

3. A controlling device, substantially as herein described, comprising a tubular fitting, a slidable rod extending through said fitting, and a spring collet having independently acting clutching portions at each end thereof sleeved upon said rod within said fitting.

4. A controlling device, substantially as herein described, comprising a tubular housing, a reciprocable rod extending through said housing, and a spring collet expanded over said rod and restrained from longitudinal movement within said housing, said collet having circuitous clamping portions extending from end to end and complete around the same.

5. A controlling device, substantially as herein described, comprising a tubular fitting, a control rod free to reciprocate within said fitting, and a spring collet sleeved on said rod and confined against longitudinal movement within said fitting, said collet having a series of longitudinal slots therein to provide spring clamping sections for said rod.

6. A controlling device, substantially as herein described, comprising a fitting having a reciprocable control rod therein, including a spring collet sleeved on said rod and slotted longitudinally at a plurality of places at both ends thereof.

7. A controlling device, substantially as herein described, comprising a fitting having a reciprocable control rod therein, including a spring collet frictionally engaging said rod having slots extending in opposite directions from the ends thereof and beyond each other.

8. A controlling device, substantially as herein described, comprising a tubular fitting, a reciprocable rod extending through said fitting, and a spring collet frictionally engaging said rod and slotted lengthwise in staggered relation from opposite ends thereof to provide an endless circuitous clamping band.

9. A controlling device, substantially as herein described, comprising a tubular fitting having a chamber and a broached flat sided opening therein, a flat sided control rod extending through said opening in said fitting, and a spring collet frictionally sleeved upon said rod and slotted from both ends to provide a circuitous clamping band.

10. A controlling device, substantially as herein described, comprising an attachment fitting having a tubular extension, a conduit affixed to said extension, a reciprocable rod extending through said fitting having a control wire passing through said conduit, and a spring collet sleeved upon said rod and confined against longitudinal movement within said fitting having longitudinal slots extending from the ends thereof and past each other to provide a circuitous clamping band for said rod.

In testimony whereof I affix my signature.

ALBERT J. WEATHERHEAD, Jr.